(12) United States Patent
Qiao et al.

(10) Patent No.: US 11,117,198 B2
(45) Date of Patent: Sep. 14, 2021

(54) COOLING CHUCK

(71) Applicant: SHANDONG WEIDA MACHINERY CO., LTD., Shandong (CN)

(72) Inventors: Wenzhang Qiao, Shandong (CN); Cong Liu, Shandong (CN); Zhonggang Liu, Shandong (CN)

(73) Assignee: SHANDONG WEIDA MACHINERY CO., LTD., Shandong (CN)

( * ) Notice: Subject to any disclaimer, the term of this patent is extended or adjusted under 35 U.S.C. 154(b) by 12 days.

(21) Appl. No.: 16/616,096

(22) PCT Filed: Aug. 27, 2018

(86) PCT No.: PCT/CN2018/098463
§ 371 (c)(1),
(2) Date: Nov. 22, 2019

(87) PCT Pub. No.: WO2019/184178
PCT Pub. Date: Oct. 3, 2019

(65) Prior Publication Data
US 2020/0215654 A1    Jul. 9, 2020

(30) Foreign Application Priority Data
Mar. 30, 2018 (CN) .......................... 201820469899.5

(51) Int. Cl.
*B23B 31/12* (2006.01)
*B23Q 11/10* (2006.01)
*B23B 51/12* (2006.01)

(52) U.S. Cl.
CPC .......... *B23B 31/1238* (2013.01); *B23B 51/12* (2013.01); *B23B 2231/24* (2013.01); *B23Q 11/10* (2013.01)

(58) Field of Classification Search
CPC ..... B23Q 11/10; B23B 51/12; B23B 2231/24; B23B 31/1238; B23B 31/1215; B23B 2231/34; Y10T 279/3493
See application file for complete search history.

(56) References Cited

U.S. PATENT DOCUMENTS 2,452,268 A * 10/1948 Schumann .............. B24B 23/02
173/75
5,580,197 A * 12/1996 Rohm ................... B23B 31/001
279/157

(Continued)

FOREIGN PATENT DOCUMENTS

CN         101041187 A      9/2007

*Primary Examiner* — Eric A. Gates
*Assistant Examiner* — Paul M Janeski

(57) ABSTRACT

A cooling chuck relating to a technical field of mechanical manufacturing of drill chuck is provided, including a drill body, a clamping jaw, a nut, a sleeve and a back cover, wherein: a connection hole is provided at a back end of the drill body for connecting to a drive mechanism; a clamping jaw outlet is provided at a front end of the drill body; a clamping jaw cavity is arranged on the drill body outside the connection hole at the back end of the drill body; the clamping jaw is arranged in the clamping jaw cavity; a thread section is arranged at a back part of the clamping jaw; the thread section at the back part of the clamping jaw is engaged with the nut arranged at an outer side surface of the clamping jaw cavity; the nut is connected to the sleeve; the back cover is arranged at the back end of the drill body; a clamping jaw slope is arranged at a back end of the clamping jaw; the clamping jaw slope inclines downward clockwise or anticlockwise along a rotation direction of the drill body; air inlets are provided on the back cover; through rotation of the drill body, the clamping jaw slope at the back end of the clamping jaw generates wind under effect of rotary force, and the wind enters the drill body through the air inlets, so (Continued)

as to decrease a product temperature. The present invention has a simple structure, is convenient to use, and is able to decrease the product temperature and improve a product life.

9 Claims, 2 Drawing Sheets

(56) References Cited

U.S. PATENT DOCUMENTS

| | | | |
|---|---|---|---|
| 6,572,310 B2* | 6/2003 | Temple-Wilson | ............................ B23B 31/1238 408/239 A |
| 2004/0227309 A1* | 11/2004 | Rohm | ................... B23B 31/123 279/62 |
| 2007/0145693 A1* | 6/2007 | Mack | .................... B23B 31/001 279/60 |

* cited by examiner

COOLING CHUCK

CROSS REFERENCE OF RELATED APPLICATION

This is a U.S. National Stage under 35 U.S.C 371 of the International Application PCT/CN2018/098463, filed Aug. 27, 2018, which claims priority under 35 U.S.C. 119(a-d) to CN 201820469899.5, filed Mar. 30, 2018.

BACKGROUND OF THE PRESENT INVENTION

Field of Invention

The present invention relates to a technical field of mechanical manufacturing of drill chuck, and more particularly to a cooling chuck which has a simple structure, is convenient to use, and is able to decrease a product temperature and improve a product life.

Description of Related Arts

As we all know, the drill chuck is a common electric tool and machining tool and is especially frequently applied in drilling and lathing. For the conventional drill chuck, the clamping jaw stretches out for clamping the tool and draws back for unclamping the tool. Generally, the drill chuck comprises a drill body, a clamping jaw, a nut, a sleeve and a back cover, wherein: a connection hole is provided at a back end of the drill body for connecting to a drive mechanism; a clamping jaw outlet is provided at a front end of the drill body; a clamping jaw cavity, which tilts inward and is interconnected with the clamping jaw outlet, is arranged on the drill body outside the connection hole at the back end of the drill body; the clamping jaw is arranged in the clamping jaw cavity; a thread section is arranged at a back part of the clamping jaw; the thread section at the back part of the clamping jaw is engaged with the nut arranged at an outer side surface of the clamping jaw cavity; the nut is connected to the sleeve; through rotation of the sleeve, the nut is driven to rotate, so that the clamping jaw stretches out and draws back in the clamping jaw cavity and the clamping jaw outlet under effect of the thread section, thereby clamping or unclamping a clamped object; and, the back cover is arranged at the back end of the drill body. The conventional drill chuck is only a common drill body; during processing, a large amount of heat will be generated, leading to the increased product temperature and the reduced service life of the chuck.

SUMMARY OF THE PRESENT INVENTION

An object of the present invention is to provide a cooling chuck which has a simple structure, is convenient to use, and is able to decrease a product temperature and improve a product life, so as to solve problems in prior art.

In order to solve the technical problems, the present invention adopts technical solutions as follows.

A cooling chuck comprises a drill body, a clamping jaw, a nut, a sleeve and a back cover, wherein: a connection hole is provided at a back end of the drill body for connecting to a drive mechanism; a clamping jaw outlet is provided at a front end of the drill body; a clamping jaw cavity, which tilts inward and is interconnected with the clamping jaw outlet, is arranged on the drill body outside the connection hole at the back end of the drill body; the clamping jaw is arranged in the clamping jaw cavity; a thread section is arranged at a back part of the clamping jaw; the thread section at the back part of the clamping jaw is engaged with the nut arranged at an outer side surface of the clamping jaw cavity; the nut is connected to the sleeve; through rotation of the sleeve, the nut is driven to rotate, so that the clamping jaw stretches out and draws back in the clamping jaw cavity and the clamping jaw outlet under effect of the thread section, thereby clamping or unclamping a clamped object; the back cover is arranged at the back end of the drill body; a clamping jaw slope is arranged at a back end of the clamping jaw; the clamping jaw slope inclines downward clockwise or anticlockwise along a rotation direction of the drill body; air inlets interconnected to an upper end of the clamping jaw cavity are provided on the back cover; through rotation of the drill body, the clamping jaw slope at the back end of the clamping jaw generates wind under effect of rotary force, and the wind enters the drill body through the air inlets, so as to decrease a product temperature.

The downward clockwise inclination of the clamping jaw slope is divided into normal clockwise inclination, inward clockwise inclination which inclines to an inner side of the drill body, and outward clockwise inclination which inclines to an outer side of the drill body; the downward anticlockwise inclination of the clamping jaw slope is divided into normal anticlockwise inclination, inward anticlockwise inclination which inclines to the inner side of the drill body, and outward anticlockwise inclination which inclines to the outer side of the drill body.

Under condition of normal clockwise inclination, an inclination angle of the clamping jaw slope at the back end of the clamping jaw is 1-10°, so as to optimize a speed of the wind and improve a service life of the cooling chuck without reducing a product precision.

Preferably, under condition of normal clockwise inclination, the optimal inclination angle of the clamping jaw slope at the back end of the clamping jaw is 5°, so as to achieve optimization of the wind speed.

Under conditions of inward clockwise inclination and inward anticlockwise inclination, an inclination angle between an inclined plane of the clamping jaw, which inclines downward along a direction of rotation circumference, and an inclined plane at the back end of the clamping jaw is 90-100°; for the thread section of the clamping jaw under conditions of inward clockwise inclination and inward anticlockwise inclination, inclination angles of a thread surface of the thread section respectively towards bottom of two ends of the clamping jaw are 80-90°; under conditions of outward clockwise inclination and outward anticlockwise inclination, the inclination angle between the inclined plane of the clamping jaw, which inclines downward along the direction of rotation circumference, and the inclined plane at the back end of the clamping jaw is 80-90°; for the thread section of the clamping jaw under conditions of outward clockwise inclination and outward anticlockwise inclination, the inclination angles of the thread surface of the thread section respectively towards the bottom of the two ends of the clamping jaw are 80-90°.

A back cover slope, which is in a same direction with the clamping jaw slope at the back end of the clamping jaw and inclines towards the air inlets, is arranged at side surfaces of the air inlets of the back cover; through rotation of the drill body, the back cover slope generates wind under effect of rotary force, and the wind enters the drill body through the air inlets, so as to decrease the product temperature.

An outer side of the back cover slope is higher or lower than an inner side of the back cover slope; an inclination angle between a conical surface generated by inward or outward inclination of the back cover slope and a center line of the connection hole is 75-90°, so as to protect the cooling chuck.

An optimal inclination angle between the conical surface generated by the inward or outward inclination of the back cover slope and the center line of the connection hole is 82°, so as to optimally generate the wind and protect the cooling chuck.

The back cover slope is defined as a helical slope, and a helical angle is 1-10°.

According to the present invention, the clamping jaw slope is arranged at the back end of the clamping jaw; the clamping jaw slope inclines downward clockwise or anticlockwise along the rotation direction of the drill body; the air inlets interconnected to the upper end of the clamping jaw cavity are provided on the back cover; through rotation of the drill body, the clamping jaw slope at the back end of the clamping jaw generates the wind under effect of rotary force, and the wind enters the drill body through the air inlets, so as to decrease the product temperature; the downward clockwise inclination of the clamping jaw slope is divided into normal clockwise inclination, inward clockwise inclination which inclines to the inner side of the drill body, and outward clockwise inclination which inclines to the outer side of the drill body; the downward anticlockwise inclination of the clamping jaw slope is divided into normal anticlockwise inclination, inward anticlockwise inclination which inclines to the inner side of the drill body, and outward anticlockwise inclination which inclines to the outer side of the drill body; under condition of normal clockwise inclination, the inclination angle of the clamping jaw slope at the back end of the clamping jaw is 1-10°, so as to optimize the speed of the wind and improve the service life of the cooling chuck without reducing the product precision; under condition of normal clockwise inclination, the inclination angle of the clamping jaw slope at the back end of the clamping jaw is preferred to be 5°, so as to achieve optimization of the wind speed; under conditions of inward clockwise inclination and inward anticlockwise inclination, the inclination angle between the inclined plane of the clamping jaw, which inclines downward along the direction of rotation circumference, and the inclined plane at the back end of the clamping jaw is 90-100°; for the thread section of the clamping jaw under conditions of inward clockwise inclination and inward anticlockwise inclination, the inclination angles of the thread surface of the thread section respectively towards the bottom of the two ends of the clamping jaw are 80-90°; under conditions of outward clockwise inclination and outward anticlockwise inclination, the inclination angle between the inclined plane of the clamping jaw, which inclines downward along the direction of rotation circumference, and the inclined plane at the back end of the clamping jaw is 80-90°; for the thread section of the clamping jaw under conditions of outward clockwise inclination and outward anticlockwise inclination, the inclination angles of the thread surface of the thread section respectively towards the bottom of the two ends of the clamping jaw are 80-90°; the back cover slope, which is in the same direction with the clamping jaw slope at the back end of the clamping jaw and inclines towards the air inlets, is arranged at the side surfaces of the air inlets of the back cover; through rotation of the drill body, the back cover slope generates the wind under the effect of rotary force, and the wind enters the drill body through the air inlets, so as to decrease the product temperature; the outer side of the back cover slope is higher or lower than the inner side of the back cover slope; the inclination angle between the conical surface generated by the inward or outward inclination of the back cover slope and the center line of the connection hole is 75-90°, so as to protect the cooling chuck; the optimal inclination angle between the conical surface generated by the inward or outward inclination of the back cover slope and the center line of the connection hole is 82°, so as to optimally generate the wind and protect the cooling chuck; the back cover slope is defined as a helical slope, and the helical angle is 1-10°. The present invention has a simple structure, is convenient to use, and is able to decrease the product temperature and improve the product life.

BRIEF DESCRIPTION OF THE DRAWINGS

FIG. 2(a)-FIG. 2(d) are diagrams of four conditions of a clamping jaw according to the present invention, wherein: FIG. 2(a) shows a front view and an upward view of the clamping jaw under condition of inward anticlockwise inclination; FIG. 2(b) shows a front view and an upward view of the clamping jaw under condition of inward clockwise inclination; FIG. 2(c) shows a front view and an upward view of the clamping jaw under condition of outward clockwise inclination; and FIG. 2(d) shows a front view and an upward view of the clamping jaw under condition of outward anticlockwise inclination.

FIG. 3(a)-FIG. 3(b) are two structural sketch views of a back cover according to the present invention, wherein: FIG. 3(a) is a structural sketch view of the back cover which inclines clockwise; and FIG. 3(b) is a structural sketch view of the back cover which inclines anticlockwise.

FIG. 4(a)-FIG. 4(b) are two front views of the back cover according to the present invention, wherein: FIG. 4(a) is a structural sketch view when an outer side of a back cover slope is lower than an inner side of the back cover slope; and FIG. 4(b) is a structural sketch view when the outer side is higher than the inner side.

DETAILED DESCRIPTION OF THE PREFERRED EMBODIMENT

Figure 1:
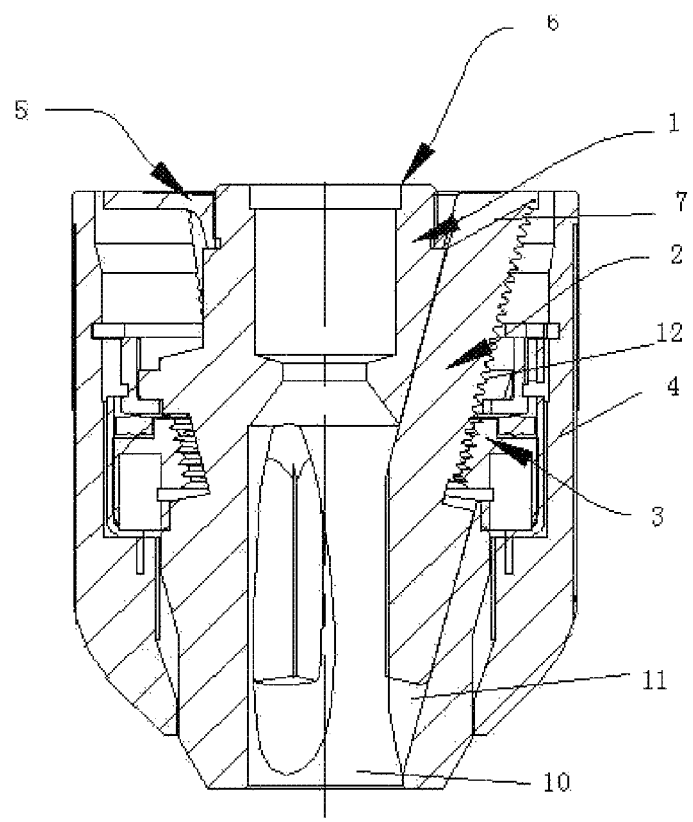
FIG. 1 is a structural sketch view of a cooling chuck according to the present invention.
Figure 2A:
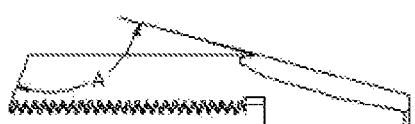
Figure 2A:
Figure 2B:
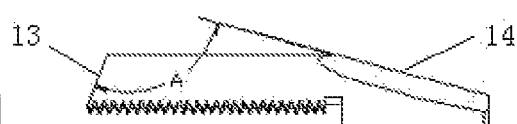
Figure 2B:
Figure 2C:
Figure 2C:
Figure 2D:
Figure 2D:
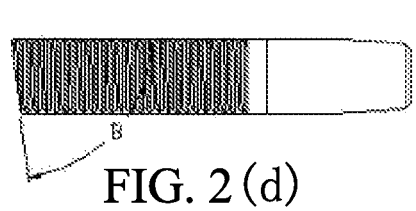

The present invention is further illustrated with accompanying drawings as follows.

As shown in FIGS. 1-4(b), a cooling chuck comprises a drill body 1, a clamping jaw 2, a nut 3, a sleeve 4 and a back cover 5, wherein: a connection hole 6 is provided at a back end of the drill body 1 for connecting to a drive mechanism; a clamping jaw outlet 10 is provided at a front end of the drill body 1; a clamping jaw cavity 11, which tilts inward and is interconnected with the clamping jaw outlet 10, is arranged on the drill body 1 outside the connection hole 6 at the back end of the drill body 1; the clamping jaw 2 is arranged in the clamping jaw cavity 11; a thread section is arranged at a back part of the clamping jaw 2; the thread section at the back part of the clamping jaw 2 is engaged with the nut 3 arranged at an outer side surface of the clamping jaw cavity 11; the nut 3 is connected to the sleeve 4; through rotation of the sleeve 4, the nut 3 is driven to rotate, so that the clamping jaw 2 stretches out and draws back in the clamping jaw cavity 11 and the clamping jaw outlet 10 under effect of the thread section, thereby clamping or unclamping a clamped object; the back cover 5 is arranged at the back end of the drill body 1; a clamping jaw slope 7 is arranged at a back end of the clamping jaw 2; the clamping jaw slope 7 inclines downward clockwise or anticlockwise along a rotation direction of the drill body; air inlets 8 interconnected to an upper end of the clamping jaw cavity 11 are provided on the back cover 5; through rotation of the drill body 1, the clamping jaw slope 7 at the back end of the clamping jaw 2 generates wind under effect of rotary force, and the wind enters the drill body through the air inlets 8, so as to decrease a product temperature; the downward clockwise inclination of the clamping jaw slope 7 is divided into normal clockwise inclination, inward clockwise inclination which inclines to an inner side of the drill body, and outward clockwise inclination which inclines to an outer side of the drill body; the downward anticlockwise inclination of the clamping jaw slope 7 is divided into normal anticlockwise inclination, inward anticlockwise inclination which inclines to the inner side of the drill body, and outward anticlockwise inclination which inclines to the outer side of the drill body; under condition of normal clockwise inclination, an inclination angle of the clamping jaw slope 7 at the back end of the clamping jaw 2 is 1-10°, so as to optimize a speed of the wind and improve a service life of the cooling chuck without reducing a product precision; under condition of normal clockwise inclination, the inclination angle of the clamping jaw slope 7 at the back end of the clamping jaw 2 is preferred to be 5°, so as to achieve optimization of the wind speed; under conditions of inward clockwise inclination and inward anticlockwise inclination, an inclination angle between an inclined plane 13 of the clamping jaw, which inclines downward along a direction of rotation circumference, and an inclined plane 14 at the back end of the clamping jaw is 90-100°; for the thread section 12 of the clamping jaw 2 under conditions of inward clockwise inclination and inward anticlockwise inclination, inclination angles of a thread surface of the thread section respectively towards bottom of two ends of the clamping jaw are 80-90°; under conditions of outward clockwise inclination and outward anticlockwise inclination, the inclination angle between the inclined plane 13 of the clamping jaw, which inclines downward along the direction of rotation circumference, and the inclined plane 14 at the back end of the clamping jaw is 80-90°; for the thread section 12 of the clamping jaw 2 under conditions of outward clockwise inclination and outward anticlockwise inclination, the inclination angles of the thread surface of the thread section respectively towards the bottom of the two ends of the clamping jaw are 80-90°; a back cover slope 9, which is in a same direction with the clamping jaw slope at the back end of the clamping jaw and inclines towards the air inlets, is arranged at side surfaces of the air inlets 8 of the back cover; through rotation of the drill body 1, the back cover slope 9 generates wind under effect of rotary force, and the wind enters the drill body 1 through the air inlets 8, so as to decrease the product temperature; an outer side of the back cover slope 9 is higher or lower than an inner side of the back cover slope 9; an inclination angle between a conical surface generated by inward or outward inclination of the back cover slope 9 and a center line of the connection hole 6 is 75-90°, so as to protect the cooling chuck; an optimal inclination angle between the conical surface generated by the inward or outward inclination of the back cover slope 9 and the center line of the connection hole 6 is 82°, so as to optimally generate the wind and protect the cooling chuck; the back cover slope 9 is defined as a helical slope, and a helical angle is 1-10°; openings of the air inlets 8 can be larger than a back end surface of the clamping jaw, so as to ensure that the clamping jaw can stretch into or out of the air inlet during movement; the clamping jaw slope and the back cover slope provided by the present invention are slopes can generate the wind both when the drill body rotates clockwise and when the drill body rotates anticlockwise, and thus any slope can generate the wind is included in the protection scope of the present invention.

Figure 3:
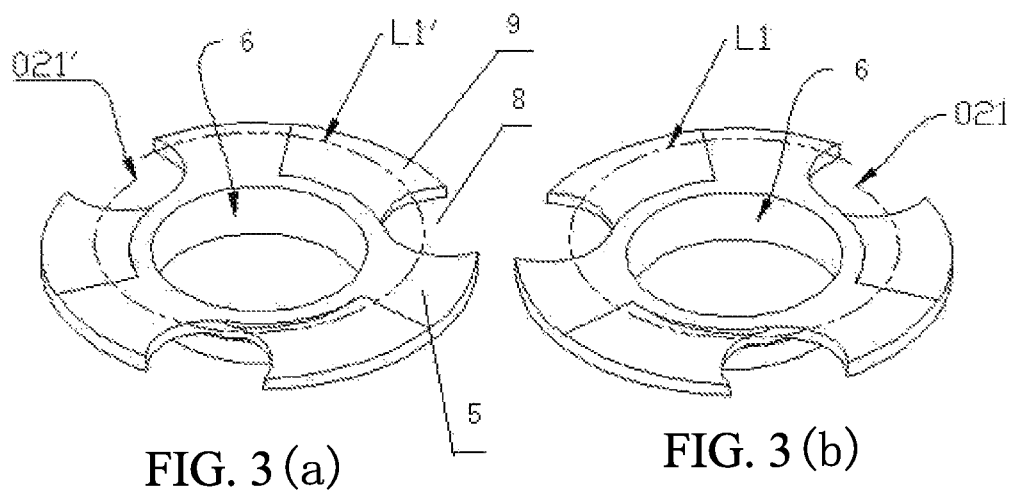
Figure 4:
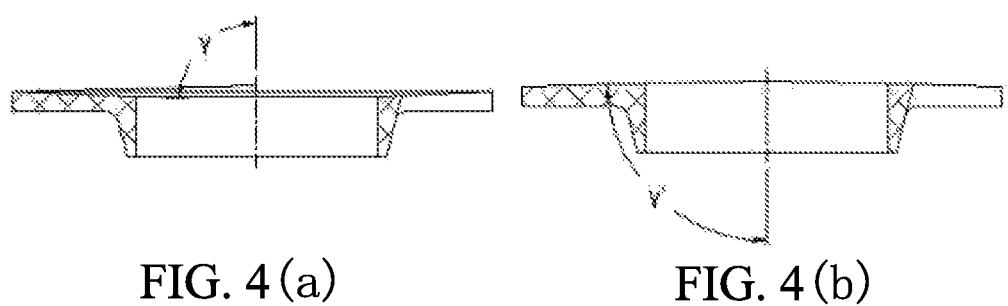

When using, because the clamping jaw slope 7 is arranged at the back end of the clamping jaw 2, the clamping jaw slope generates the wind under the effect of rotary force of the drill body; when rotating clockwise, the clamping jaw slope 7 at the back end of the clamping jaw 2 inclines towards the direction of thread center line, inclines outward, or inclines downward clockwise; the back cover slope 9 of the back cover 5 correspondingly inclines downward clockwise, so as to meet the principle of generating wind and ensure that the generated wind flows downward; therefore, under the effects of the back cover slope 9 of the back cover 5 and the clamping jaw slope 7 at the back end of the clamping jaw 2, the generated wind can rapidly decrease the product heat generated by rotation of the drill bit, decrease the temperature of cooling chuck and product, and increase the service life of the cooling chuck; otherwise, with the different usages of the product, under the condition of anticlockwise rotation, the clamping jaw slope 7 at the back end of the clamping jaw 2 and the back cover slope 9 of the back cover 5 are arranged in a way that the generated wind flows downward, so as to also achieve the function of decreasing the product temperature. In FIG. 2(*a*)-FIG. 2(*d*) which are four structural sketch views of the clamping jaw, under conditions of inward clockwise inclination and inward anticlockwise inclination, the inclination angle A between the inclined plane 13 which inclines downward along the direction of rotation circumference of the clamping jaw and the inclined plane 14 at the back end of the clamping jaw is 90-100°; for the thread section 12 of the clamping jaw 2 under conditions of inward clockwise inclination and inward anticlockwise inclination, the inclination angles B and B' of the thread surface of the thread section respectively towards the bottom of the two ends of the clamping jaw are 80-90°; under conditions of outward clockwise inclination and outward anticlockwise inclination, the inclination angle A' between the inclined plane 13 which inclines downward along the direction of rotation circumference of the clamping jaw and the inclined plane 14 at the back end of the clamping jaw is 80-90°; for the thread section 12 of the clamping jaw under conditions of outward clockwise inclination and outward anticlockwise inclination, the inclination angles B and B' of the thread surface of the thread section respectively towards the bottom of the two ends of the clamping jaw are 80-90°. FIG. 3(*a*) and FIG. 3(*b*) are two structural sketch views of the back cover. With passing through any point 021 (021') in the air inlet and adopting the center line of the connection hole 6 as the axis, the clockwise helical line L1 (L1' is the anticlockwise helical line) is generated, and the lead angle of the helical line is namely the helical angle $\alpha$ ($1° <= \alpha <= 10°$) of the back cover. FIG. 4(*a*)-FIG. 4(*b*) are two front views of the back cover. When the outer side of the back cover slope 9 is lower than the inner side in a concave angle $\gamma$; $75° <= \gamma < 90°$, and the concave angle $\gamma$ of 82° is preferred. When the outer side of the back cover slope 9 is higher than the inner side in a concave angle $\gamma'$; $75° <= \gamma' < 90°$, and the concave angle $\gamma'$ of 82° is preferred.

According to the present invention, the clamping jaw slope 7 is arranged at the back end of the clamping jaw 2; the clamping jaw slope 7 inclines downward clockwise or anticlockwise along the rotation direction of the drill body; the air inlets 8 interconnected to the upper end of the clamping jaw cavity 11 are provided on the back cover 5; through rotation of the drill body 1, the clamping jaw slope 7 at the back end of the clamping jaw 2 generates the wind under the effect of rotary force, and the wind enters the drill body through the air inlets 8, so as to decrease the product temperature; the downward clockwise inclination of the clamping jaw slope 7 is divided into normal clockwise inclination, inward clockwise inclination which inclines to the inner side of the drill body, and outward clockwise inclination which inclines to the outer side of the drill body; the downward anticlockwise inclination of the clamping jaw slope 7 is divided into normal anticlockwise inclination, inward anticlockwise inclination which inclines to the inner side of the drill body, and outward anticlockwise inclination which inclines to the outer side of the drill body; under condition of normal clockwise inclination, the inclination angle of the clamping jaw slope 7 at the back end of the clamping jaw 2 is 1-10°, so as to optimize the speed of the wind and improve the service life of the cooling chuck without reducing the product precision; under condition of normal clockwise inclination, the inclination angle of the clamping jaw slope 7 at the back end of the clamping jaw 2 is preferred to be 5°, so as to achieve optimization of the wind speed; under conditions of inward clockwise inclination and inward anticlockwise inclination, the inclination angle between the inclined plane 13 of the clamping jaw, which inclines downward along the direction of rotation circumference, and the inclined plane 14 at the back end of the clamping jaw is 90-100°; for the thread section 12 of the clamping jaw 2 under conditions of inward clockwise inclination and inward anticlockwise inclination, the inclination angles of the thread surface of the thread section respectively towards the bottom of the two ends of the clamping jaw are 80-90°; under conditions of outward clockwise inclination and outward anticlockwise inclination, the inclination angle between the inclined plane 13 of the clamping jaw, which inclines downward along the direction of rotation circumference, and the inclined plane 14 at the back end of the clamping jaw is 80-90°; for the thread section 12 of the clamping jaw 2 under conditions of outward clockwise inclination and outward anticlockwise inclination, the inclination angles of the thread surface of the thread section respectively towards the bottom of the two ends of the clamping jaw are 80-90°; the back cover slope 9, which is in the same direction with the clamping jaw slope at the back end of the clamping jaw and inclines towards the air inlets, is arranged at the side surfaces of the air inlets 8 of the back cover; through rotation of the drill body 1, the back cover slope 9 generates the wind under the effect of rotary force, and the wind enters the drill body 1 through the air inlets 8, so as to decrease the product temperature; the outer side of the back cover slope 9 is higher or lower than the inner side of the back cover slope 9; the inclination angle between the conical surface generated by inward or outward inclination of the back cover slope 9 and the center line of the connection hole 6 is 75-90°, so as to protect the cooling chuck; the optimal inclination angle between the conical surface generated by the inward or outward inclination of the back cover slope 9 and the center line of the connection hole 6 is 82°, so as to optimally generate the wind and protect the cooling chuck; the back cover slope 9 is defined as the helical slope, and the helical angle is 1-10°; the openings of the air inlets 8 can be larger than the back end surface of the clamping jaw, so as to ensure that the clamping jaw can stretch into or out of the air inlet during movement; the cooling chuck provided by the present invention has the simple structure, is convenient to use, and is able to decrease the product temperature and improve the product life.

What is claimed is:

1. A cooling chuck, comprising a drill body, a clamping jaw, a nut, a sleeve and a back cover, wherein: a connection hole is provided at a back end of the drill body for connecting to a drive mechanism; a clamping jaw outlet is provided at a front end of the drill body; a clamping jaw cavity, which tilts inward and is interconnected with the clamping jaw outlet, is arranged on the drill body outside the connection hole at the back end of the drill body; the clamping jaw is arranged in the clamping jaw cavity; a thread section is arranged at a back part of the clamping jaw; the thread section at the back part of the clamping jaw is engaged with the nut arranged at an outer side surface of the clamping jaw cavity; the nut is connected to the sleeve; through rotation of the sleeve, the nut is driven to rotate, so that the clamping jaw moves radially in the clamping jaw cavity and the clamping jaw outlet under effect of the thread section, thereby clamping or unclamping a clamped object; the back cover is arranged at the back end of the drill body; a clamping jaw slope is arranged at a back end of the clamping jaw; the clamping jaw slope inclines downward clockwise or anticlockwise along a rotation direction of the drill body; air inlets interconnected to an upper end of the clamping jaw cavity are provided on the back cover; through rotation of the drill body, the clamping jaw slope at the back end of the clamping jaw generates wind under effect of rotary force, and the wind enters the drill body through the air inlets, so as to decrease a temperature of the cooling chuck.

2. The cooling chuck, as recited in claim 1, wherein: downward clockwise inclination of the clamping jaw slope is divided into normal clockwise inclination, inward clockwise inclination which inclines to an inner side of the drill body, and outward clockwise inclination which inclines to an outer side of the drill body; the downward anticlockwise inclination of the clamping jaw slope is divided into normal anticlockwise inclination, inward anticlockwise inclination which inclines to the inner side of the drill body, and outward anticlockwise inclination which inclines to the outer side of the drill body.

3. The cooling chuck, as recited in claim 2, wherein: under condition of normal clockwise inclination, an inclination angle of the clamping jaw slope at the back end of the clamping jaw is 1-10°.

4. The cooling chuck, as recited in claim 2, wherein: under condition of normal clockwise inclination, an optimal inclination angle of the clamping jaw slope at the back end of the clamping jaw is 5°.

5. The cooling chuck, as recited in claim 2, wherein: under conditions of inward clockwise inclination and inward anticlockwise inclination, an inclination angle between an inclined plane of the clamping jaw, which inclines downward along a direction of rotation circumference, and an inclined plane at the back end of the clamping jaw is 90-100°; for the thread section of the clamping jaw under conditions of inward clockwise inclination and inward anticlockwise inclination, inclination angles of a thread surface of the thread section respectively towards bottom of two ends of the clamping jaw are 80-90°; under conditions of outward clockwise inclination and outward anticlockwise inclination, the inclination angle between the inclined plane of the clamping jaw, which inclines downward along the direction of rotation circumference, and the inclined plane at the back end of the clamping jaw is 80-90°; for the thread section of the clamping jaw under conditions of outward clockwise inclination and outward anticlockwise inclination, the inclination angles of the thread surface of the thread section respectively towards the bottom of the two ends of the clamping jaw are 80-90°.

6. The cooling chuck, as recited in claim 1, wherein: a back cover slope, which is in a same direction with the clamping jaw slope at the back end of the clamping jaw and inclines towards the air inlets, is arranged at side surfaces of the air inlets of the back cover; through rotation of the drill body, the back cover slope generates wind under effect of rotary force, and the wind enters the drill body through the air inlets, so as to decrease the temperature of the cooling chuck.

7. The cooling chuck, as recited in claim 6, wherein: an outer side of the back cover slope is higher or lower than an inner side of the back cover slope; an inclination angle between a conical surface generated by inward or outward inclination of the back cover slope and a center line of the connection hole is 75-90°.

8. The cooling chuck, as recited in claim 7, wherein: an optimal inclination angle between the conical surface generated by the inward or outward inclination of the back cover slope and the center line of the connection hole is 82°.

9. The cooling chuck, as recited in claim 6, wherein: the back cover slope is defined as a helical slope, and a helical angle is 1-10°.

* * * * *